July 7, 1936.  W. H. BOLDINGH  2,046,543
DEVICE FOR MAKING STEREOSCOPIC X-RAY PHOTOGRAPHS
Filed Nov. 11, 1929  2 Sheets-Sheet 1
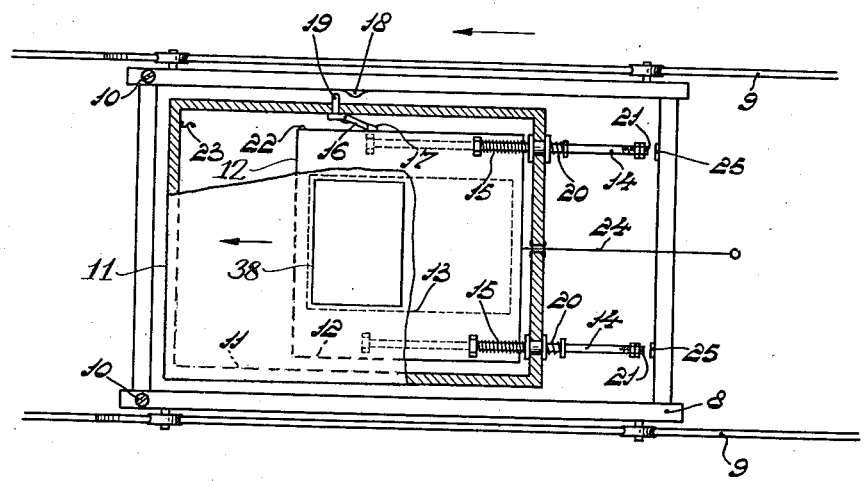
Inventor:
Willem Hondius Boldingh, July 7, 1936. W. H. BOLDINGH 2,046,543
DEVICE FOR MAKING STEREOSCOPIC X-RAY PHOTOGRAPHS
Filed Nov. 11, 1929 2 Sheets-Sheet 2

Inventor:
Willem Hondius Boldingh,
by
Lauger, Parry, Card & Hauger
Att'ys.

Patented July 7, 1936

2,046,543

UNITED STATES PATENT OFFICE 2,046,543

DEVICE FOR MAKING STEREOSCOPIC X-RAY PHOTOGRAPHS

Willem Hondius Boldingh, Eindhoven, Netherlands, assignor to N. V. Philips' Gloeilampenfabrieken, Eindhoven, Netherlands, a limited liability company of the Netherlands Application November 11, 1929, Serial No. 406,405
In the Netherlands November 24, 1928

4 Claims. (Cl. 250—34)

The invention relates to apparatus for producing stereoscopic X-ray images.

For taking stereoscopic photographs of X-ray images it is required to take two photographs, preferably at as short intervals as possible, of the same object whereby the exposure is effected from two different points spaced apart a certain distance from each other, which distance preferably corresponds to the normal distance between the human eyes. This may be done by means of two different X-ray tubes which are properly spaced apart from one another, whilst between both exposures the exposed photographic plate or film must be replaced by a fresh one.

The present invention relates to an apparatus for producing stereoscopic X-ray images by means of a single X-ray tube, which receives a displacement required for stereoscopic photography simultaneously with the displacement of a cassette containing one or more photographic plates or films. For this purpose the X-ray tube and the cassette are mechanically connected together in such a manner that a displacement of the cassette along a distance at least corresponding to the length of the images to be taken measured in the direction of displacement, is attended with the required displacement of the X-ray tube. Besides the advantage that one X-ray tube may be dispensed with in this case, the apparatus according to the invention has the further advantage that both photographs belonging together may be taken by means of one and the same tube, which undoubtedly contributes to the sharpness.

It is preferable to record both photographs belonging together side by side on one photographic plate or film, since in this case it will appear that the images, after having been developed, are always correctly positioned relative to one another. Therefore the displacement of the cassette and the movement of the X-ray tube attended therewith, should preferably have the same direction. The dependence between the displacements of the cassette and those of the tube may be obtained, for example, by mechanically connecting the cassette and the carrier of the tube by a lever system, although one or more cords running over pulleys may also serve for this purpose. In another embodiment of the invention, the displacement of the cassette is effected by the action of a spring, which may be allowed to relax by displacing the carrier of the X-ray tube. Thereby the backward movement of the cassette may cause the X-ray tube to return to its initial position and the spring is stretched. In this embodiment the apparatus may comprise a pawl system which when occupying its initial position prevents the spring from relaxing and is lifted by the movement of the carrier. The apparatus according to the invention is preferably so arranged that a displacement of the X-ray tube is attended with a rotation of same such that the axis of the X-ray cone intersects the photographic plate or film practically in the same point in space before and after the displacement. The displacement of the X-ray tube may be effected by pivoting the carrier of the tube upon a definite axis preferably lying in the plane of the photographic plate or film.

The invention will be more fully explained with reference to the accompanying drawings, in which:

Figure 1 is a schematic diagram showing the manner in which the X-ray tube and the cassette must be displaced to produce two images belonging together.

Fig. 2 is a schematic view of an apparatus in which a film cassette and a carrier for the X-ray tube are mechanically interconnected by means of cords running over pulleys so that the required movement of the cassette is attended with that of the carrier.

Fig. 3 is a partly sectionized top view of an apparatus in which the displacement of the cassette is effected by the action of a spring.

Fig. 4 is a schematic view of an apparatus in which the required displacement of the X-ray tube is effected by a rotation of the carrier for the X-ray tube.

Figure 5:
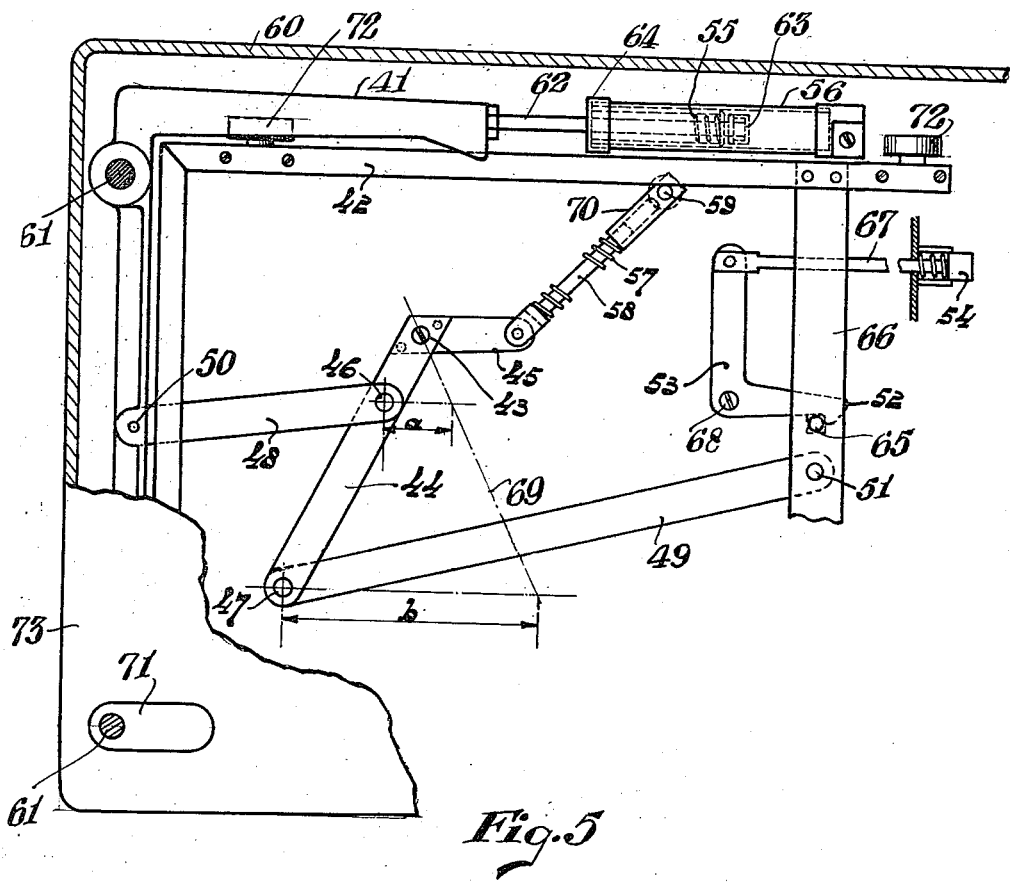
Fig. 5 is a partly sectionized view of a portion of an apparatus in which the tube and the cassette are connected by means of a lever system.

In Figure 1, 1 denotes an X-ray tube and 2 a cassette containing one or more photographic plates. After a photograph has been taken with the tube in its left hand position the tube is displaced into the right hand position, whereupon another photograph is taken. Meanwhile it is of course necessary to change the photographic plate. For this purpose the cassette should receive a displacement which is at least equal to the size of the images measured in the direction of displacement. A displacement of the X-ray tube along a distance *a* should consequently be attended with a displacement of the cassette along a distance *b*. In general the distance *b* will differ from distance *a* and as a rule it will be greater.

With the apparatus according to the invention the tube and the cassette are mechanically connected together so that both the above-mentioned displacements occur interdependently and that a correct displacement of one of these parts of the apparatus is attended with that of the other part.

In Figure 2, 3 designates a small carriage to which arms may be attached for carrying the X-ray tube. The carriage may be adapted for example, to run on rails, whereby the X-ray tube is moved from the position from which the exposure is effected to the other position. A film cassette 4 is connected to the carriage by means of a cord 5 running over a fixed pulley 6 and a pulley 7 attached to the carriage. In this case the displacement of the film cassette is consequently twice as great as that of the carriage. Though in the arrangement shown in Figure 2 the movement of the carriage 3 and that of the film cassette 4 are opposite relatively to one another, the arrangement may also be made such that both members move in the same direction.

In Figure 3 a carriage 8 may run on rails 9. The carriage comprises a pair of arms to which the X-ray tube is secured, said arms having a section denoted by 10. Inside the frame of the carriage is provided a casing 11 whose side walls are shown in section, said casing not being moved on taking the stereoscopic photograph. Within the casing which is made, for example, of copper is placed a cassette 12, comprising a film 13 indicated in dotted lines, on which both X-ray images belonging together are recorded side by side. The cover of the casing 11 is provided with a window 38 of aluminium, so that the X-rays may penetrate to the photographic plate where the image must be formed.

The cassette has attached to it a pair of rods 14 on which cylindrical spiral springs 15 are slipped, said springs exerting a force on the cassette in the direction of the arrow but being prevented from displacing the cassette contained in the casing 11 by a pawl 16 bearing against a cam 17. If, however, the carriage 8 is moved in the direction of the arrow, a cam 18 attached to the carriage moves against a cam 19 which is movably connected to the wall of the casing 11, thus pressing cam 19 inwardly against the action of a spring so that the pawl 16 is lifted. In this case the cam 17 is no longer arrested and the film cassette is displaced by springs 15 until the nuts 21 touch the abutment stop 25, the shock being absorbed by springs 20. Furthermore an arrangement is provided comprising a pin 22 which is received by a spring 23 to prevent rebound of the cassette due to the elastic shock. By pulling a cord or handle 24 secured to the cassette in a direction opposite to that of the arrow, the cassette is moved back to its initial position, thus compressing springs 15. The ends of the rods 14 then abut at 25 against the carriage 8, so that also the latter is moved back and returns to its initial position. In order to assure that the carriage always occupies the correct terminal positions, the rails 9 may be provided with recesses into which the rollers of the carriage are continuously moved by gravity acting on the aggregate. The movements of both the carriage 8 and the film cassette occur within a very short interval so that the exposures may also take place at a very short interval of time.

In Figure 4 an X-ray tube 30 is attached to a frame work 31 by means of one or more arms 32, said frame rotating about a rigid spindle 33. In this way the tube may be brought into the position indicated in dotted lines so that two exposures from different points may be effected. In both cases the X-ray image is recorded on a film placed in the cassette at the same place in space, since the axis 35 of the X-ray cone intersects the sensitized plate in both positions in the same point in space. In this way stereoscopic photographs may be taken of a body 36 placed upon the table 37.

Fig. 5 is a detail view of an embodiment of the apparatus according to the invention. I have shown in this figure a portion of the tube carrier 41 and portions of the cassette holder 42, (sliding on rollers 72) which are mutually connected by a lever system. Both the cassette holder and the portion of the tube carrier shown in the drawings are located in the cassette channel 60.

Rods 61 are shown in section, which extend through the slots 71 in the cover 73 of the cassette channel. The channel itself is shown as a section through its side walls so that the cover is removed with the purpose of showing the parts lying inside the channel. The rods 61 extending above the cassette channel serve as supporting members for an X-ray tube lying in front of the cassette at a certain distance therefrom. They correspond to rods 10 of Fig. 3.

The lever system is constituted by several members and is secured at 50 to the tube carrier 41 and at 51 to the cassette holder. The bottom of the cassette channel is to be imagined as lying behind the lever system parallel to the plane of the drawings.

A pivot 43 is fixed to the bottom of the cassette channel. The lever 44 may be swung about the pivot 43 and has rigidly secured to it a lever 45. Rods 48 and 49 are pivotally connected to the lever 44 at 46 and 47. The rod 48 is hingedly connected at 50 to the tube carrier 41, whilst rod 49 is hingedly connected at 51 to the cassette holder 42. The ratio between the distances 43—46 and 43—47 is equal to that of the required displacements of the tube and the photographic plate.

The spring 55 is located in the tube 56, which is secured to the cassette channel 60. The tube carrier has secured to it a rod 62 provided with a head 63 (indicated in dotted lines).

One end of the spring 55 bears on the head 63, the other on the bottom 64 of tube 56. It thereby tends to push the head 63 to the right.

The spring is however prevented from expanding by a latch 52 attached to a tumbler 53. The latch engages a pawl 65, which is fixed to the strip 66, connecting the side walls of the cassette holder, the tumbler being mounted on a pivot 68 fixed to the bottom of the cassette channel. The tumbler 53 may be turned by means of a rod 67 ending at the right hand side of the cassette channel and provided with a press button 54. By pushing the button 54 one turns the tumbler 53 and lifts the latch 52. The spring 55 is then permitted to expand and moves the tube carrier 41 to the right, thus causing the lever 44, which is actuated by the rod 48, to perform a counterclockwise rotation about the pivot 43 until this lever has reached the position indicated by dotted line 69.

The tube carrier is then shifted along a distance $a$ and the cassette holder along a distance $b$, due to the pivot 47 being disposed at a greater distance from the pivot 43 than is the pivot 46. The ratio of these distances may be so chosen that the displacement of the X-ray tube corresponds to the normal distance between human eyes and the displacement of the cassette slightly exceeds the dimension of the X-ray photographs as measured in the direction of movement.

Fig. 5 also shows a spring 57 encircling a plunger 58 and acting between the lever 45 and a bushing 70, in which slides the plunger 58. By means of the spring 57 a pressure is exerted on the lever 45 whereby the pivot 59 fixed on the bottom of the cassette channel acts as a reaction point.

It depends on the position of the lever in what sense the spring 57 exerts a moment on the lever system. In the position shown in the figure the couple acts in a clockwise sense, thus counteracting the spring 55. If the displacement is half way the force of the spring 57 is just directed through the pivot 43 so that it exerts no longer a couple on the system. On further displacements the springs 55 and 57 act in the same sense.

By this arrangement it is ensured that the force at which the moving system is displaced is rendered more uniform than in case of only providing the spring 55 since the force exerted by this spring naturally depends on the extent to which it is stretched. Now the arrangement is such that the spring 57 counteracts the spring 55 if the latter is strongly stretched, whilst spring 57 supports the action of the spring 55 if it expands and consequently slackens.

It should be understood that when referring to a mechanical connection by means of cords running over pulleys, this also includes the case in which the connections are formed by one or more chains which may run over toothed wheels if desired.

What I claim is:

1. An X-ray apparatus for taking stereoscopic X-ray photographs, comprising means defining a flat cassette channel, the upper wall of which has a window, translucent to X-rays, a tube carrier mounted on said channel, and adapted to hold an X-ray tube in front of said window, said channel enclosing a cassette holder adapted for holding a film cassette behind said window, said tube carrier being movable from one fixed and predetermined terminal position to another fixed and predetermined position, and a lever system connected between said cassette holder and said tube carrier and pivotally secured to the cassette channel to cause the cassette holder to be shifted a distance exceeding the dimension of said window as measured in the direction of movement as an incident to movement of the tube carrier from one terminal position to the other.

2. An X-ray apparatus for taking stereoscopic X-ray photographs, comprising means defining a flat cassette channel, the upper wall of which has a window translucent to X-rays, a tube carrier mounted on said channel, and adapted to hold an X-ray tube in front of said window, said channel enclosing a cassette holder adapted to hold a film cassette behind said window, said tube carrier being movable from one fixed and predetermined terminal position to another, means for shifting said cassette holder from one fixed and predetermined terminal position along a predetermined distance exceeding the dimension of said window as measured in the direction of movement to another fixed terminal position, said means comprising a spring acting between the channel and the said cassette holder, and which is strained as an incident to movement of the cassette holder into one terminal position, a pawl system for preventing the spring from relaxing when strained, and means for rendering said pawl system inoperable at any desired moment to cause the spring to relax and to drive the movable parts connected therewith to their initial position.

3. An X-ray apparatus for taking stereoscopic X-ray photographs, comprising means defining a flat cassette channel, the upper wall of which has a window translucent to X-rays, movable parts comprising a tube carrier and a cassette holder, said tube carrier being mounted on said channel and adapted to hold an X-ray tube in front of said window, said cassette holder being enclosed by said channel and adapted to hold a film cassette behind said window, means connecting said movable parts for transmitting a motion of one of them to the other and means connected to said channel and movable parts for establishing the motion from outside said channel.

4. An X-ray apparatus for taking stereoscopic X-ray photographs, comprising means defining a flat cassette channel the upper wall of which has a window translucent for X-rays, a tube carrier mounted on said channel, and adapted to hold an X-ray tube in front of said window, said channel enclosing a cassette holder adapted to hold a film cassette behind said window, said tube carrier being movable from an initial fixed and predetermined terminal position to an opposite fixed and predetermined terminal position and reversely, said cassette holder being slidable from an initial fixed and predetermined position over a distance exceeding the dimension of said window as measured in the direction of movement into a second fixed and predetermined position, a lever system connecting cassette holder with the tube carrier and the channel, said lever system being adapted to transmit the motion of the tube carrier relative to the cassette channel, to the cassette holder, a spring connected between the channel and the tube carrier, energy being stored in said spring by moving the tube carrier together with the cassette holder from their initial position to their second terminal position, a pawl system, a portion of which is connected to said channel and a portion of which is connected to said cassette holder, said portions being in engagement with each other when the tube carrier and cassette holder are in their second terminal position and thereby preventing said spring from relaxing, and means cooperating with one of said portions of said pawl system to discontinue said engagement at any desired moment, and to release the spring thereby, to restore the tube carrier together with the cassette holder to their initial position.

WILLEM HONDIUS BOLDINGH.